Aug. 15, 1950                P. V. HAYES                2,519,134
                        PRESSURE CONTROL SWITCH
Filed Dec. 6, 1946                                    2 Sheets-Sheet 1
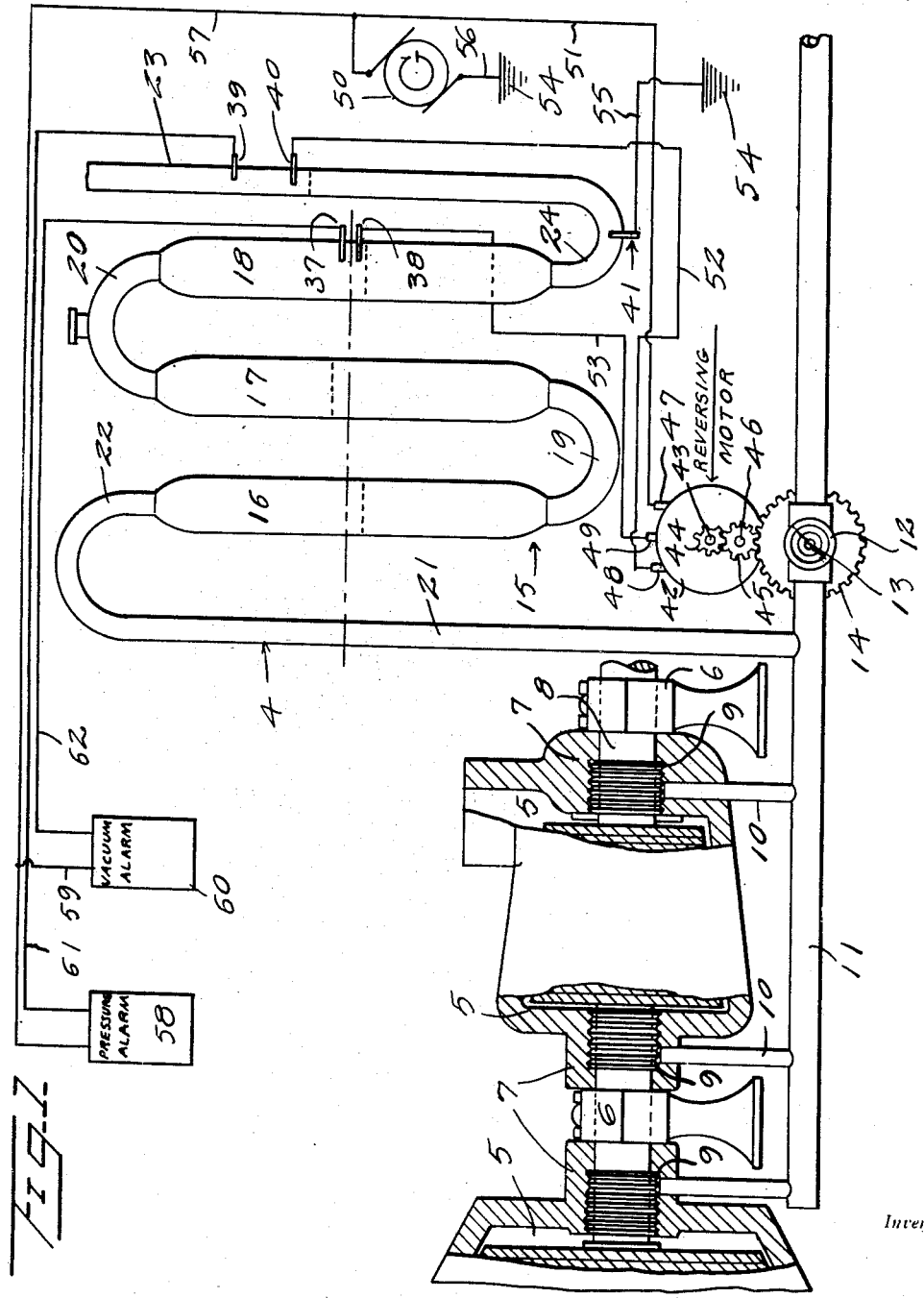
Inventor
Paul V. Hayes
By Randolph & Beavers
Attorneys

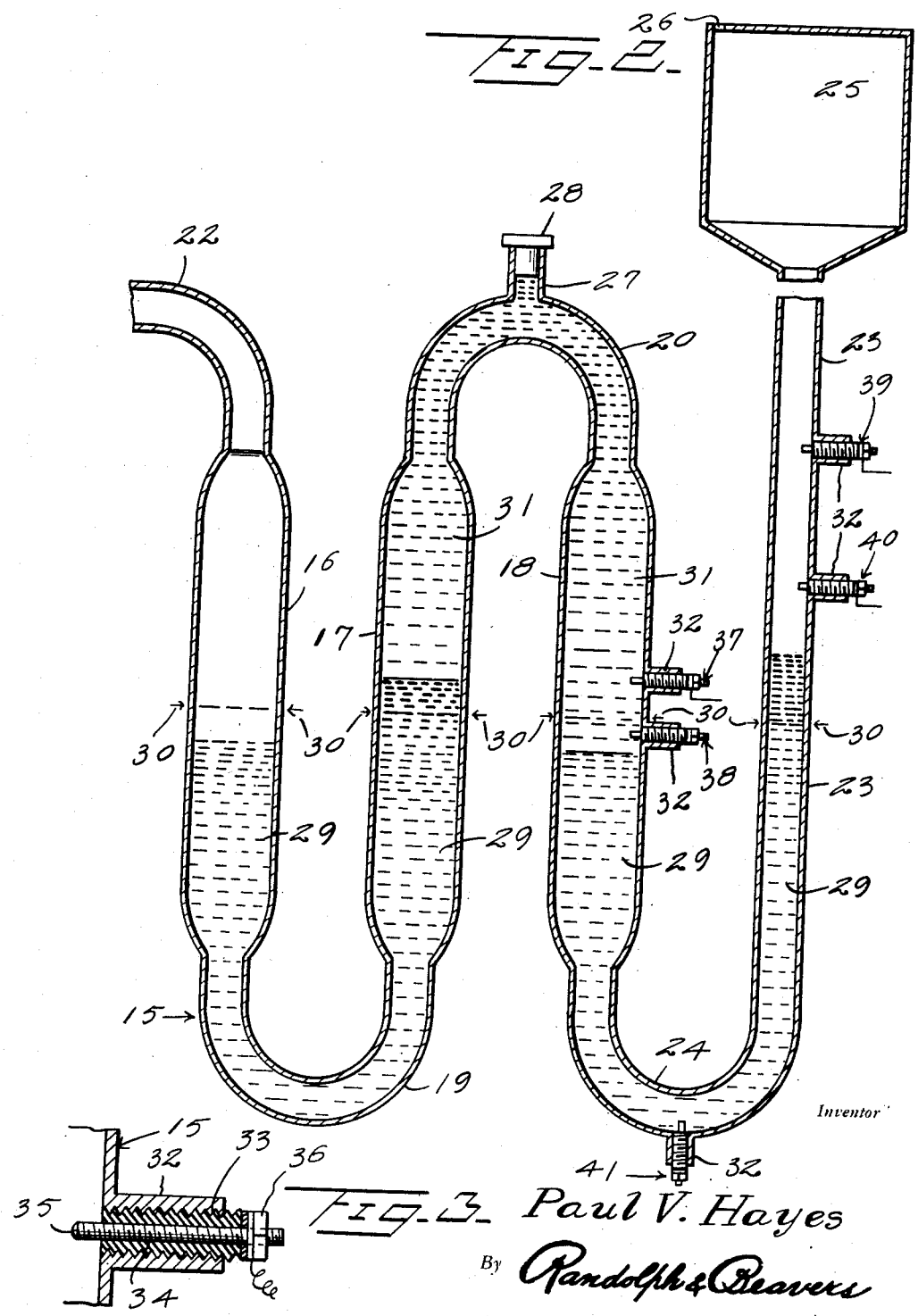

Patented Aug. 15, 1950

2,519,134

UNITED STATES PATENT OFFICE 2,519,134

PRESSURE CONTROL SWITCH

Paul V. Hayes, Groveland, Ill., assignor of thirty per cent to V. Ray Van Wey, Pekin, Ill.

Application December 6, 1946, Serial No. 714,594

3 Claims. (Cl. 200—81.6)

This invention relates to an automatic control and regulating device adapted for attachment to an escapement conduit or the like by means of which pressure is normally maintained on seals for automatically actuating a valve or other regulator in the escapement conduit to automatically maintain a predetermined pressure or pressure range within the escapement conduit so that a desired amount of pressure will be provided by the escape medium on the seals.

More particularly, it is an object of the present invention to provide a regulating device actuated by the pressure of the escaped medium for actuating and deactuating means to control the pressure of the medium in the escapement conduit or the like.

Various other objects and advantages of the invention will hereinafter become more fully apparent from the following description of the drawings accompanying and forming a part hereof, illustrating a preferred embodiment thereof and wherein:

Figure 1 is a side elevational view, partly in section illustrating one embodiment of the invention in conjunction with one adaptation thereof;

Figure 2 is a longitudinal, substantially central sectional view of a portion of the control device as shown on an enlarged scale with respect to Figure 1, and Figure 3 is an enlarged fragmentary sectional view, partly in side elevation, of one of the electrical contact members and its mounting.

The present invention finds utility in substantially any application where a compressed medium is subject to leakage and the pressure of the escaped medium is confined and thus applied to seals or other means by means of which the initial escapement of the medium is reduced or regulated.

The pressure control device, hereinafter to be described and illustrated in the drawings, may be utilized in connection with steam turbines, refineries, distilleries and similar adaptations where it is necessary to regulate the escape of a compressed medium through pressure seals or similar devices.

For the purpose of illustration, the drawings illustrate one adaptation of the invention for use with the pressure seals of a steam turbine to regulate the escapement of steam by way of steam seals between the turbine shell or housing and the turbine shaft. Accordingly, in this embodiment, the pressure medium utilized is the escape steam which in substance is vapor or distilled water. However, in other adaptations and uses of the regulator, air, water, gasoline, oil or certain other substances could constitute the escaped medium and the actuating means of the control device.

In connection with steam turbines and similarly in other apparatus where an escaped medium is utilized for actuating pressure seals for preventing or limiting the escape of the medium as necessary for numerous reasons, the escaped medium is generally confined in a manifold conduit or header from which it is released by manually actuated control valves for maintaining a predetermined range of pressure in the header or conduit to thereby maintain the desired pressure on the seals. In order to function effectively, such an arrangement requires substantially a constant vigil so that manual adjustment of the control valve may be made promptly to compensate for pressure variations in the conduit or header.

The present invention provides an apparatus which will operate automatically in response to pressure variations in the escapement conduit or header for making or breaking an electric circuit to a reversible electric motor by means of which the regulating valves of the conduit or header will be automatically operated to open or close upon the occurrence of an increase or decrease, respectively, in the pressure within the escapement conduit or header and on the pressure seals.

Referring more specifically to the drawings, for the purpose of illustrating one adaptation of the pressure control device, designated generally 4, the numeral 5 designates inner portions about the blading and blading hubs of a steam turbine having housing portions 7 through which a turbine shaft 8 extends. The housing portions 7 contain steam leak off pressure seals 9 which surround portions of the shaft 8 and which are located adjacent to turbine shaft bearings 6 for limiting the escape of the pressure medium from the turbine portions 5, in this instance, said medium constituting steam. The housing portions 7 each receive an end of a lateral conduit 10 which opens into the seal 9 thereof and through which the pressure medium from the turbine portions 5 may escape into the header or conduit 11, into which the opposite ends of the pipes 10 open. The header or conduit 11 is closed at the end thereof located adjacent to the pipes or conduits 10 and is provided between its outlet end and said conduits 10 with a control valve 12 which may be of any suitable construction capable of being fully opened or closed or partially opened and which includes a rotatable shaft 13 adapted to be normally manually actuated by a hand wheel, and on which is installed a gear 14 which is keyed to the shaft 13 and which forms a part of the pressure control and regulating device 4.

The pressure control and regulating device 4 includes a conduit, designated generally 15 and which is preferably formed of a material which is a non-conductor of electricity. The conduit 15 is lapped vertically to form three substantially parallel portions 16, 17 and 18 which are preferably enlarged with respect to the remainder of the conduit 15. The portions 16 and 17 are connected at their lower ends by an integral, substantially U-shaped portion 19 and the intermediate portion 17 and the portion 18 are connected at their upper ends by a similarly shaped, inverted U-shaped portion 20 which is likewise of smaller diameter than the portions 16, 17 and 18. The conduit 15 also includes a portion 21 which communicates at one end thereof with the header 11, between the conduit 10 and the valve 12 and which extends upwardly therefrom and has a turned back upper portion 22 joining the upper end of the conduit leg to portion 16. The opposite end of the conduit 15 includes a conduit portion 23 which is disposed substantially parallel to the portions 16, 17, 18 and 21 and which is provided with a turned back lower end 24, the terminal of which merges with the lower end of the leg portion 18. The upper end of the conduit portion 23 preferably merges with and opens into a dome or container 25, as seen in Figure 2, which is closed except for a vent opening 26 in the top thereof and for a purpose hereinafter to be described. The conduit portions 19, 20 and 24 are all of substantially the same external and internal diameters and are each of smaller diameter than the leg portions 16, 17 and 18.

The intermediate part of the inverted U-shaped portion 20 is provided with an integral upwardly extending and upwardly opening filling neck 27 normally closed by a plug or closure 28. The lower portions of the legs 16 and 17 and the connecting U-shaped portion 19 are filled with mercury as indicated at 29 and the lower portion of the leg 18 and the lower part of the conduit portion 23 and its U-portion 24 are likewise filled with mercury so that the columns of mercury 29 will normally extend upwardly to the level as indicated by the arrows 30. The upper ends of the legs 17 and 18 and the inverted U-shaped portion 20 is then filled through the neck 27 with a liquid which is a non-conductor of electricity, such as oil and so that the two columns of oil 31 will rest on the upper ends of the columns of mercury contained in legs 17 and 18.

The conduit leg 18 contains two longitudinally spaced bosses 32, one of which is disposed just beneath the level line 30 and the other of which is disposed a slightly greater distance thereabove. The conduit portion 23 also contains two longitudinally spaced bosses 32 which are disposed substantially above the normal mercury level line 30 and the U-shaped conduit portion 24 also contains a boss 32, which is located in the lower part thereof. Each of the bosses 32, as best illustrated in Figure 3, is internally threaded to receive an externally threaded bushing 33 of insulating material and which extends from the inner end thereof to beyond the outer end and which is provided with a central bore 34 which is internally threaded to receive a threaded rod 35. The rod 35 has an inner end protruding into the conduit 15 and an outer end projecting from the outer end of its bushing 33 and combined therewith to form a plug or closure for the bore of the boss 32 with which it is associated. The rod 35 is formed of an electrical conducting material to form an electrical contact. Each of the rods 35 has a pair of nuts or a nut washer 36 threaded on its outer end and by means of which an electrical conductor wire may be electrically connected thereto. The parts previously described and best illustrated in Figure 3 are identical in each of the bosses 32. The conductor rod of the upper boss 32 of the conduit leg 18 forms an electrical contact 37 and the rod 35 of the other boss of the leg 18 forms an electrical contact 38. The rod 35 of the upper and lower bosses 32 of the conduit portion 23 form electrical contacts 39 and 40, respectively, and the rod 35 which is associated with the turned back conduit portion 24 forms an electrical contact 41. Control device 4 includes a reversing electric motor 42 to the driven shaft 43 of which a pinion 44 is keyed. An intermediate pinion or gear 45 which may be journalled on a pin or stub shaft 46 projecting from the casing of the motor 42, is interposed between and meshes with the pinion 44 and gear 14 for revolving the gear 14 and shaft 13 from the motor shaft 43 and at a considerably reduced speed relatively thereto. The motor 42 has three contact posts 47, 48 and 49. The contact post 47 is electrically connected to the positive side of a source of electric current, here indicated by a generator 50, by means of a conductor wire 51. The contact post 48 is connected by conductor wire 52 to the contact 40 in the conduit portion 23 and the contact post 49 is connected by a conductor wire 53 to the contact point 38 in the leg 18. The contact point 41 is connected to a ground 54 by a conductor wire 55 and the generator or electrical source 50 is also connected to the ground 54 of the circuit by a conductor wire 56.

The positive conductor 51 of the source of the electric current 50 also has a branch conductor 57 leading to one post of a pressure alarm 58 and a branch 59 of the conductor wire 57 leads to the positive post of a vacuum alarm 60. The alarms 58 and 60 may be of any conventional type including audible or visual alarms. The negative post of the pressure alarm 58 is connected by a conductor wire 61 to the upper contact point 39 of the conduit portion 23 and the negative post of the vacuum alarm 60 is connected by a conductor wire 62 to the upper contact point 37 of the leg 18.

Assuming that a leakage of steam past the seal 9 into the conduit 10 produces a pressure in the manifold 11 so that the pressure in the manifold 11 and pipes 10 are maintained on the seal 9 within a desired range, by control of the valve 12, and that such pressure range is between one quarter and one pound. It must be readily apparent that the same pressure will be maintained in the conduit portions 21 and 22 and in the upper part of the conduit leg 16 so that said pressure will impinge against the upper end of the column of mercury 29 located in the leg 16 and forcing the mercury downwardly in the leg 16 and upwardly in the leg 17. It will be readily apparent that the mercury column in the leg 17 by being raised will raise the oil column 31 in the leg 17 and force the oil column 31 downwardly in the leg 18 to thereby lower the mercury column 29 of the leg 18 to the same extent that the mercury column is raised in the leg 17 and the mercury column in the conduit portion 23 will rise to a greater extent, due to the fact that the diameter of said portion is reduced. Assuming that a quarter of a pound pressure of the steam or compressed medium in the upper end of the leg 16 so displaces the mercury columns and oil column that the mercury column 29 of the leg 18 will move downwardly until it is just beneath and out of contact with the electrical contact point 38, and further assuming that one pound steam pressure in the upper end of the leg 16 will displace the mercury columns and oil column sufficiently to move the mercury column 29 within the conduit portion 23 upwardly into contact with the contact point 40, it will be readily apparent that when the mercury columns are between and out of engagement with both the contact points 38 and 40 that a pressure within the desired range exists within the manifold 11 and pipes 10 and on the seals 9.

With this condition prevailing the valve 12 will be slightly open to permit escape of certain of the steam past the valve and into the outlet end of the manifold conduit 11 where a slight vacuum or at least no pressure exists to hamper the escapement of the steam. With the mercury column thus disposed the electric motor 42 will be deenergized so that the valve 12 will remain in a fixed, partially open position. Should the pressure in the manifold 11 diminish to below one quarter pound, the mercury column would rise in the legs 16 and 18 and lower in the legs 17 and 23 so that the mercury would contact the contact point 38 to ground the circuit of the electric motor 42 through the wire 53, contact 38, the mercury column in leg 18 between contact 38 and contact 41, and from contact 41 through the wire 55 to the ground 54 of the circuit so that the reversing motor 42 would be actuated and turn the shaft 43 in a direction to move the valve 12 toward a closed position. This would cause a reduction in the amount of steam escaping past the valve 12 and an increased pressure in the manifold 11 to thereby cause the mercury column to be displaced in the opposite direction and so that the column of mercury of the leg 18 would lower and be out of engagement with the contact 38 for interrupting the circuit to the electric motor 42 through the post 49, to thereby again deenergize the motor and interrupt the movement of the valve 12, toward a closed position. On the other hand, should the pressure increase in the manifold 11 the columns of mercury in the legs 16 and 18 would fall to levels below those as shown in Figure 2 and the columns of mercury in the legs 17 and 23 would rise still higher than illustrated until the mercury 29 in the leg 23 contacted the contact point 40. When this occurs, the electric motor 42 would be energized by the circuit thereof being grounded from the post 48 through the conductor wire 52, contact 40 and the mercury 29 between the contact 40 and 41, contact 41 through the conductor wire 55 to the ground. The reversible motor 42 being thusly energized would revolve its shaft 43 in the opposite direction for turning the shaft 13 in a direction to open the valve 12 to release a greater amount of the compressed medium for reducing the pressure, and upon sufficient reduction of pressure in the manifold 11 to lower the mercury column 29 of leg 23 out of contact with the contact point 40, the electric motor 42 would again be deenergized and the valve 12 movement interrupted.

In case a sudden lowering of pressure to zero amount should occur in the manifold 11 and a vacuum is created therein causing the mercury 29 in the legs 16 and 18 to rise substantially above the normal level line 30, the mercury column in the leg 18 will contact contact point 37 completing an electrical circuit by the establishment of a ground through the mercury and through the contact 41 and wire 55 so that there is electric current through the conductor wires 57 and 59, the vacuum alarm 60 and back through the conductor wire 62 for energizing and actuating the vacuum alarm 60 to indicate a vacuum in the manifold 11 and at the seals.

If, on the other hand, an excess pressure should suddenly develop in the manifold 11 which would raise the mercury columns in the legs 17 and 23 excessively, the mercury in leg 23 would move into contact with the contact point 39 for closing the circuit from the electrical source 50 through the wire 57 and the pressure alarm 58, back through the wire 61 and contact 39 through the mercury 29 in leg 23 to contact 41 and thence to the ground 54 for energizing the pressure alarm 58. The dome or container 25 is provided to accommodate a part of the mercury 29 in case of such excess pressure and the vent opening 26 is formed on top thereof to permit the free passage of air back and forth therethrough to prevent a pressure or vacuum occurring above the mercury in the leg 23 and which would tend to prevent the normal movement of the mercury and oil columns.

As previously stated, the conduit 15 is preferably formed of a non-electrically conducting material such as glass or other transparent and insulative material so that the levels of the mercury columns may be observed therethrough and so that the electrical circuits completed through the mercury columns in legs 23 and 18 will be fully insulated from other portions thereby making the device adaptable where the pressure medium is of an inflammable nature or itself an electrical conductor. It will be readily apparent that the conduit 15 could be formed of opaque material and in certain installations would not need to be formed of a non-conducting material, since the contact rods 35 are insulated therefrom, as previously described and as illustrated in Figure 3 and which is unnecessary unless the conduit 15 is formed of a material which is a conductor of electricity.

The control would be adapted for operating various alarms, valves, pumps etc. in systems such as tanks and piping apparatus to automatically provide desired volumes inside of containers, vats or other apparatus.

Various other modifications and changes are likewise contemplated and may obviously be resorted to in adapting the device to various uses as for example for employment with refineries or distilleries, without departing from the spirit and scope of the invention as hereinafter defined by the appended claims.

I claim:

1. A pressure responsive apparatus comprising a conduit having one end adapted to communicate with a source of pressure, the opposite end of the conduit being vented to the atmosphere, said conduit having a plurality of substantially vertically disposed, horizontally spaced lapped portions forming legs, of which said first mentioned end forms a part of one of the legs, conduit portions forming a part of said conduit and connecting adjacent ends of adjacent lapped portions, the lower portions of certain of said conduit legs and certain of said conduit portions being filled with a fluent, electrical conducting material, the upper portions of certain of said legs and other of the connecting conduit portions therebetween being filled with a fluent, non-electrical conducting material which is supported by the columns of the fluent electrical conducting material and sealed off thereby from the ends of the conduit, electrical contacts interposed in certain of the legs of the conduit, an electric contact disposed in the conduit and positioned to be maintained at all times in engagement with the fluent electrical conducting material, certain of the first mentioned electric contacts being adapted to be interposed in each of two electric circuits, said last mentioned electric contact being adapted to form a part of each circuit, the first mentioned contacts being disposed to be at times alternately engaged by the electrical conducting fluent material in response to an increase or a decrease of pressure beyond a prescribed range in said first mentioned end of the conduit for selectively closing the circuit of which it forms a part.

2. A pressure responsive device comprising a tube adapted to be connected at one end to a variable source of pressure, the opposite end of the conduit being vented to the atmosphere, said tube having a substantially U-shaped portion containing a fluent, electrical conducting material normally extending in columns to a predetermined level therein, electrical contacts extending into the legs of the U-shaped tube portion certain of which are adapted to be interposed in each of two electric circuits each including a source of electric current, certain of said contacts being disposed above the normal level of the fluent material and within said tube, and a grounded contact forming a part of each circuit located in constant electrical contact with said fluent material, said fluent material being displaceable in the legs of the U-shaped portion of the tube in response to pressure variations in said tube end and being movable thereby either alternately or intermittently, into engagement with the first mentioned electrical contacts, normally disposed above said columns, for selectively energizing and de-energizing the electric circuits.

3. A device as in claim 2, and certain of the first mentioned electrical contacts being adapted to be interposed in circuits of audible alarms together with said grounded contact for intermittently or alternately closing said last mentioned circuits in response to excessive pressure fluctuations.

PAUL V. HAYES.

REFERENCES CITED

The following references are of record in the file of this patent:

UNITED STATES PATENTS

| Number | Name | Date |
|---|---|---|
| 902,600 | Penniman | Nov. 3, 1908 |
| 1,615,582 | Hawkins | Jan. 25, 1927 |
| 1,638,814 | Epstein | Aug. 9, 1927 |
| 1,713,833 | Kochendorfer | May 21, 1929 |
| 2,057,889 | Fagan | Oct. 20, 1936 |
| 2,078,479 | Briggs | Apr. 27, 1937 |
| 2,320,508 | Burns | June 1, 1943 |
| 2,336,399 | Isserstedt | Dec. 7, 1943 |

FOREIGN PATENTS

| Number | Country | Date |
|---|---|---|
| 226,128 | Germany | Oct. 1, 1910 |